United States Patent [19]
Otsuka et al.

[11] Patent Number: 6,123,313
[45] Date of Patent: Sep. 26, 2000

[54] SEISMIC ISOLATION APPARATUS

[75] Inventors: Susumu Otsuka; Kunio Hayakawa, both of Osaka; Ikuo Shimoda, Tokyo; Kiyoharu Suzuki, Tokyo; Masami Mochimaru, Tokyo; Mitsuru Miyazaki, Tokyo, all of Japan

[73] Assignees: Okumura Corporation, Osaka; Oiles Corporation, Tokyo, both of Japan

[21] Appl. No.: 09/100,809

[22] Filed: Jun. 22, 1998

[30] Foreign Application Priority Data

Jun. 25, 1997 [JP] Japan .................................. 9-185790
Apr. 14, 1998 [JP] Japan .................................. 10-121710

[51] Int. Cl.⁷ ............................. F16M 13/00; E04H 9/02
[52] U.S. Cl. ........................ 248/580; 52/167.5; 248/638
[58] Field of Search ................................. 248/580, 636, 248/638, 562; 52/167.5, 167.6, 167.4

[56] References Cited

U.S. PATENT DOCUMENTS

| | | | |
|---|---|---|---|
| 1,761,659 | 6/1930 | Cummings | 52/167.5 |
| 2,014,643 | 9/1935 | Bakker | 384/49 |
| 2,359,036 | 9/1944 | Harper | 296/35.1 |
| 4,662,133 | 5/1987 | Kondo | 52/167.5 |
| 4,687,174 | 8/1987 | Helary et al. | 248/638 |
| 4,883,250 | 11/1989 | Yano et al. | 248/638 |
| 4,917,211 | 4/1990 | Yamada et al. | 52/167.6 X |
| 5,261,200 | 11/1993 | Sasaki et al. | 52/167.5 |
| 5,544,452 | 8/1996 | Fuijta et al. | 52/167.2 |
| 5,913,503 | 6/1999 | Satoh et al. | 248/636 |
| 5,934,029 | 8/1999 | Kawai et al. | 52/167.5 |

*Primary Examiner*—Anita M. King
*Attorney, Agent, or Firm*—Nixon & Vanderhye

[57] ABSTRACT

A seismic isolation apparatus is structured such that a pair of seismic isolation mechanisms are formed each having a pair of upper and lower clamping members formed in the shape of a rectangular frame, wherein upper and lower roller guide surfaces, in each of which a longitudinal central portion is formed as a concavely arcuate curved surface and portions respectively extending therefrom are formed as convexly arcuate curved surfaces, are formed on the four sides of the upper and lower clamping members, and wherein rollers each having a circular cross section are respectively interposed between the upper and lower roller guide surfaces. The pair of seismic isolation mechanisms are installed by being superposed on top of each other such that the rolling directions of the rollers in the two seismic isolation mechanisms are perpendicular to each other. During the occurrence of an earthquake, the rollers are adapted to roll in contact with the upper and lower roller guide surfaces so as to absorb and dampen seismic waves in the longitudinal and transverse directions of the apparatus.

13 Claims, 5 Drawing Sheets

SEISMIC ISOLATION APPARATUS

BACKGROUND OF THE INVENTION

1. Field of the Invention

The present invention relates to improvements in a seismic isolation apparatus for providing seismic isolation for and supporting a building structure, an exhibit case, various machines and equipment, a floor, or the like.

2. Description of the Related Art

As a seismic isolation system or a vibration control device adapted to absorb seismic energy at the time of occurrence of an earthquake and control the transmission of vibration to an upper portion, ones having various structures have hitherto been developed. The assignee of the present invention has also developed an apparatus adopting a seismic isolation structure which is comprised of roller bearings, as disclosed in, for example, Japanese Patent Application Publication No. 6490/1996. As shown in FIG. 11, this apparatus has a structure in which a seismic isolation mechanism A is formed by interposing a roller 61 with a circular cross section between concave circular arc surfaces 51 and 52 which are formed on opposing surfaces of a pair of upper and lower clamping members 41 and 42, a plurality of these seismic isolation mechanisms A are arranged in an identical plane in a state in which the rolling directions of their rollers 61 are set in the same direction, and seismic isolation mechanisms A each having the same structure are integrally arranged above these seismic isolation mechanisms A in a state in which the rolling direction of their rollers 61 is set in a direction perpendicular to the rolling direction of the rollers 61 of the aforementioned seismic isolation mechanisms A.

According to the seismic isolation mechanism arranged as described above, the transmission of seismic waves to the upper clamping member 41 can be controlled by absorbing horizontal vibrations acting in the lower clamping member 42 by the roller 61 which rolls in contact with the concave upper and lower circular arc surfaces 51 and 52, and the upper clamping member 41 can be restored to its original position when the earthquake is subsided. However, since the concave upper and lower circular arc surfaces 51 and 52 which clamps the roller 61 are formed with curves surfaces having a fixed identical radius of curvature, if the roller 61 has rolled in contact with the opposing circular arc surfaces 51 and 52 of the upper and lower clamping members while a loaded object C on the seismic isolation apparatus is being lifted up in a stationary state in which the roller 61 is at its lowest position, a restoring force F of the loaded object C on the seismic isolation apparatus increases linearly in proportion to a rolling distance X of the roller 61, as shown by solid lines in FIG. 12, and the spring constant (restoring characteristic) of a supporting portion based on the roller 61 becomes fixed. Accordingly, this seismic isolation apparatus is provided with a fixed natural frequency, and if the seismic waves of the earthquake approach the neighborhood of this natural frequency, the phenomenon of noticeable resonance occurs, so that there is a problem in that, contrary to the vibration isolating effect, a vibration exciting effect is exhibited with respect to an object placed on the seismic isolation apparatus.

In addition, the above-described seismic isolation apparatus must be assembled such that, by using the plurality of single seismic isolation mechanisms A in each of which the roller 61 with a circular cross section is interposed between the concave circular arc surfaces 51 and 52 which are formed on opposing surfaces of the pair of upper and lower clamping members 41 and 42, these seismic isolation mechanisms A are arranged at, for example, four sides with fixed intervals provided between them in the longitudinal and transverse directions, an intermediate plate B is disposed on these seismic isolation mechanisms A arranged at the four sides, and the other seismic isolation mechanisms A are arranged on this intermediate plate B in a state in which the rolling direction of their rollers 61 is set in a direction perpendicular to the rolling direction of the rollers 61 of the lower seismic isolation mechanisms A. Therefore, much labor and time are required for the installation operation. Moreover, all the seismic isolation mechanisms A that are arranged at the four sides must be set such that their rollers 61 roll in the same direction, so that considerable time and trouble as well as expertise are required. Furthermore, there are problems in that the overall thickness (height) of the apparatus becomes large, which not only impairs the outer appearance but can impose a restraint on the condition of use, and an impression is given that the loaded object C is placed in an unstable state.

Further, the structure provided is such that the concave circular arc surfaces 51 and 52 are provided on the overall opposing surfaces of the clamping members 41 and 42, while the roller 61 over its substantially entire length is in contact with the circular arc surfaces 51 and 52 in their widthwise direction. Therefore, if the diameter of the roller 61 varies even slightly in its lengthwise direction, or if there are very small projections on its peripheral surface, the roller 61 rattles and can be possibly deflected in the axial direction. For this reason, there arises a need to separately provide a guide groove for allowing the roller 61 to roll in an accurate direction, with the result that there is a problem in that the overall apparatus becomes complex.

SUMMARY OF THE INVENTION

The present invention has been devised in view of the above-described problems, and it is an object of the present invention to provide a seismic isolation apparatus which is capable of demonstrating an outstanding seismic isolation effect without resonating with seismic waves, which has a simple structure and allows installation to be effected easily and accurately, and which is capable of lowering the overall height of the apparatus as much as possible.

To attain the above object, in accordance with a first aspect of the present invention, there is provided a seismic isolation apparatus comprising: a pair of seismic isolation mechanisms each having a pair of upper and lower clamping members, wherein roller guide surfaces are provided in a number of locations on opposing surfaces of the upper and lower clamping members, and rollers each having a circular cross section are respectively interposed between the upper and lower roller guide surfaces in such a manner as to be capable of rolling in an identical horizontal direction, the pair of seismic isolation mechanisms are combined vertically integrally such that a rolling direction of the rollers in the upper seismic isolation mechanism is perpendicular to a rolling direction of the rollers in the lower seismic isolation mechanism, and wherein a central portion in the rolling direction of the roller in at least one of the upper and lower roller guide surfaces provided on the opposing surfaces of the upper and lower clamping members is formed as a concavely arcuate curved surface, and portions respectively extending from opposite ends of the concavely arcuate curved surface are formed as convexly arcuate curved surfaces.

In accordance with a second aspect of the present invention, in the seismic isolation apparatus according to the first aspect of the invention, in the upper and lower guide surfaces provided on the upper and lower clamping members, another one of the roller guide surfaces is formed as a flat surface or a concavely arcuate surface having a large radius of curvature.

In accordance with a third aspect of the present invention, in the seismic isolation apparatus according to the first aspect of the invention, in the upper and lower guide surfaces, another one of the roller guide surfaces is formed as a curved surface identical to one of the roller guide surfaces.

In accordance with a fourth aspect of the present invention, in the seismic isolation apparatus according to any one of the first to third aspects of the invention, if it is assumed that a lowest point O in the concavely arcuate curved surface is an origin, a Y axis is taken in a horizontal direction from this point O, a Z axis is taken in a vertical direction from this point O, a horizontal length of each of the roller guide surfaces is Ym, and a vertical height thereof is Zm, then the shape of each of the roller guide surfaces, in which the central portion in the rolling direction of the roller is formed as the concavely arcuate curved surface, and the portions respectively extending from the opposite ends of the concavely arcuate curved surface are formed as the convexly arcuate curved surfaces, has a curve expressed by the following formula in YZ coordinates:

$$Z=0.5 \times Zm \times \{1-\cos(\pi Y/Ym)\}$$

In accordance with a fifth aspect of the present invention, instead of the above-described upper and lower roller guide surfaces, one of the roller guide surfaces is formed as a concavely arcuate roller guide surface having a fixed radius of curvature, while another one of the roller guide surfaces is formed as a flat roller guide surface or a concavely arcuate roller guide surface having a radius of curvature different from that of one of the roller guide surfaces.

In accordance with a sixth aspect of the present invention, in the seismic isolation apparatus according to the first or fifth aspect of the invention, each of the upper and lower clamping members has horizontal girder members juxtaposed with a fixed interval therebetween, a pair of side wall portions having a fixed height are respectively provided on each of the horizontal girder members of the upper clamping member in such a manner as to project downward, a pair of side wall portions having a fixed height are respectively provided on each of the horizontal girder members of the lower clamping member in such a manner as to project upward, the upper and lower roller guide surfaces are respectively formed on the opposing side wall portions of the upper and lower horizontal girder members, and each of the rollers is interposed between the upper and lower horizontal girder members such that small-diameter opposite end portions of each of the rollers are brought into clamping contact with the upper and lower roller guide surfaces in such a manner as to be capable of rolling.

In accordance with a seventh aspect of the present invention, in the seismic isolation apparatus according to the first or fifth aspect of the invention, each of the upper and lower clamping members has horizontal girder members juxtaposed with a fixed interval therebetween, a pair of side wall portions having a fixed height are respectively provided on opposite long side edges of each of the horizontal girder members of one of the clamping members, a rail portion which is interposed between the side wall portions of one of the clamping members is formed in a central portion of each of the horizontal girder members of another one of the clamping members, the upper and lower roller guide surfaces are respectively formed on the side wall portions and the rail portion of the upper and lower clamping members, and each of the rollers is interposed between the upper and lower roller guide surfaces in such a manner as to be capable of rolling.

In accordance with the first aspect of the present invention, the seismic isolation structure is arranged such that the roller guide surfaces are provided in a number of locations on opposing surfaces of the upper and lower clamping members, and the rollers are respectively interposed between the upper and lower roller guide surfaces. Therefore, by disposed the rollers between the opposing roller guide surfaces of the upper and lower clamping members, it is possible to easily and accurately assemble the seismic isolation mechanisms in which the rollers are interposed at a number of locations. During the occurrence of an earthquake, all the rollers can be made to roll smoothly in contact with the respective upper and lower guide surfaces.

Further, since a central portion in the rolling direction of the roller in at least one of the upper and lower roller guide surfaces provided on the opposing surfaces of the upper and lower clamping members is formed as a concavely arcuate curved surface, and portions respectively extending from opposite ends of the concavely arcuate curved surface are formed as convexly arcuate curved surfaces, in the event that the rollers have rolled in contact with the upper and lower roller guide surfaces from their stationary state where the rollers are at their lowest position, the restoring force for the loaded object which is applied to the seismic isolation apparatus becomes nonlinear with respect to the rolling distance of the rollers. Accordingly, the spring constant of the supporting portion of each roller changes as the roller rolls, and the natural frequency of the seismic isolation apparatus changes in correspondence with that change. Hence, even if various seismic waves are applied to this seismic isolation apparatus, the seismic isolation apparatus practically does not resonate, and exhibits a seismic isolation effect effectively.

As the shapes of the roller guide surfaces for making it possible to suppress the occurrence of resonance with respect to the seismic waves in the above-described manner, one of the upper and lower guide surfaces may be formed such that its central portion is a concavely arcuate curved surface and portions extending from the opposite ends of the central portion are formed as convexly arcuate curved surfaces, while the other guide surface may be formed as a flat surface or a concavely arcuate surface having a large radius of curvature as in the second aspect of the present invention, or as in the third aspect of the present invention both the upper and lower roller guide surfaces may be formed in the shape of the roller guide surfaces described in the first aspect of the present invention. Still alternatively, one of the roller guide surfaces may be formed as a concavely arcuate roller guide surface having a fixed radius of curvature, while another one of the roller guide surfaces may be formed as a flat roller guide surface or a concavely arcuate roller guide surface having a radius of curvature different from that of one of the roller guide surfaces. Even in such arrangements, the restoring force for the loaded object which is applied to the seismic isolation apparatus becomes nonlinear with respect to the rolling distance of the rollers as described above, and the possibility of resonance with the seismic waves is practically eliminated. Hence, the seismic isolation apparatus is capable of exhibiting a seismic isolation effect by reliably absorbing the seismic energy.

In addition, the seismic isolation mechanism in accordance with the sixth aspect of the present invention is comprised of the upper clamping member and the lower clamping member each having horizontal girder members juxtaposed in the longitudinal or transverse directions of the apparatus, as well as the rollers each disposed between the roller guide surfaces formed on the opposing long side wall portions of the horizontal girder members of the upper and lower clamping members, the rollers being provided with a fixed interval therebetween in the longitudinal direction of the horizontal girder member. Accordingly, the structure is very simple, and the apparatus can be manufactured at low cost. In addition, since the roller guide surfaces are formed with a fixed longitudinal interval therebetween on the respective side wall portions on the long sides of the juxtaposed horizontal girder members, all the roller guide surfaces of the upper and lower clamping members can be oriented in the same direction, with the result that a highly accurate seismic isolation apparatus can be arranged.

Furthermore, after the rollers are respectively disposed on the roller guide surfaces provided on four sides of the lower clamping member, if the upper clamping member is simply superposed on the lower clamping member, it is possible to easily and accurately assemble the seismic isolation mechanism in which the rollers are respectively interposed between the vertically opposing roller guide surfaces. Moreover, the roller guide surfaces are formed on the side wall portions of the upper horizontal girder member projecting downward and on the side wall portions of the lower horizontal girder member projecting upward, the roller is interposed between the upper and lower horizontal girder members, and the small-diameter opposite end portions are brought into clamping contact with the upper and lower guide surfaces on both sides. Therefore, the height of the combined upper and lower clamping members can be made low, so that the support of a loaded object, such as a building or an exhibit case or other objects, can be stabilized. During the occurrence of a earthquake, the small-diameter opposite end portions of each roller rolls accurately and smoothly in contact with the upper and lower roller guide surfaces on both sides, thereby making it possible to maintain a reliable seismic isolation function.

In addition, in accordance with a seventh aspect of the present invention, the arrangement provided is such that each horizontal girder member of one rectangular frame-shaped subassembly has a pair of side wall portions with a fixed height provided on opposite long side edges of its elongated rectangular horizontal plate portion, while each horizontal girder member of the other rectangular frame-shaped subassembly has a rail portion formed at a central portion of its elongated rectangular horizontal plate portion, the rail portion being interposed between the side wall portions of one horizontal plate portion. Further, the pairs of upper and lower roller guide surfaces are respectively formed on the side wall portions and the rail portion of these upper and lower rectangular frame-shaped subassemblies with a fixed interval provided therebetween in the longitudinal direction of the rectangular frame-shaped subassembly, and each of the rollers is interposed between the upper and lower roller guide surfaces in such a manner as to be capable of rolling. Thus, the seismic isolation mechanism is arranged such that the rail portion provided in the other horizontal girder member is fitted in the space between the opposite side wall portions of one horizontal girder member, so that the overall height can be made even lower, thereby making it possible to arrange a seismic isolation apparatus whose stability is improved.

The above and other objects, features and advantages of the present invention will become more apparent from the following detailed description of the invention when read in conjunction with the accompanying drawings.

DESCRIPTION OF THE PREFERRED EMBODIMENT

Figure 1:
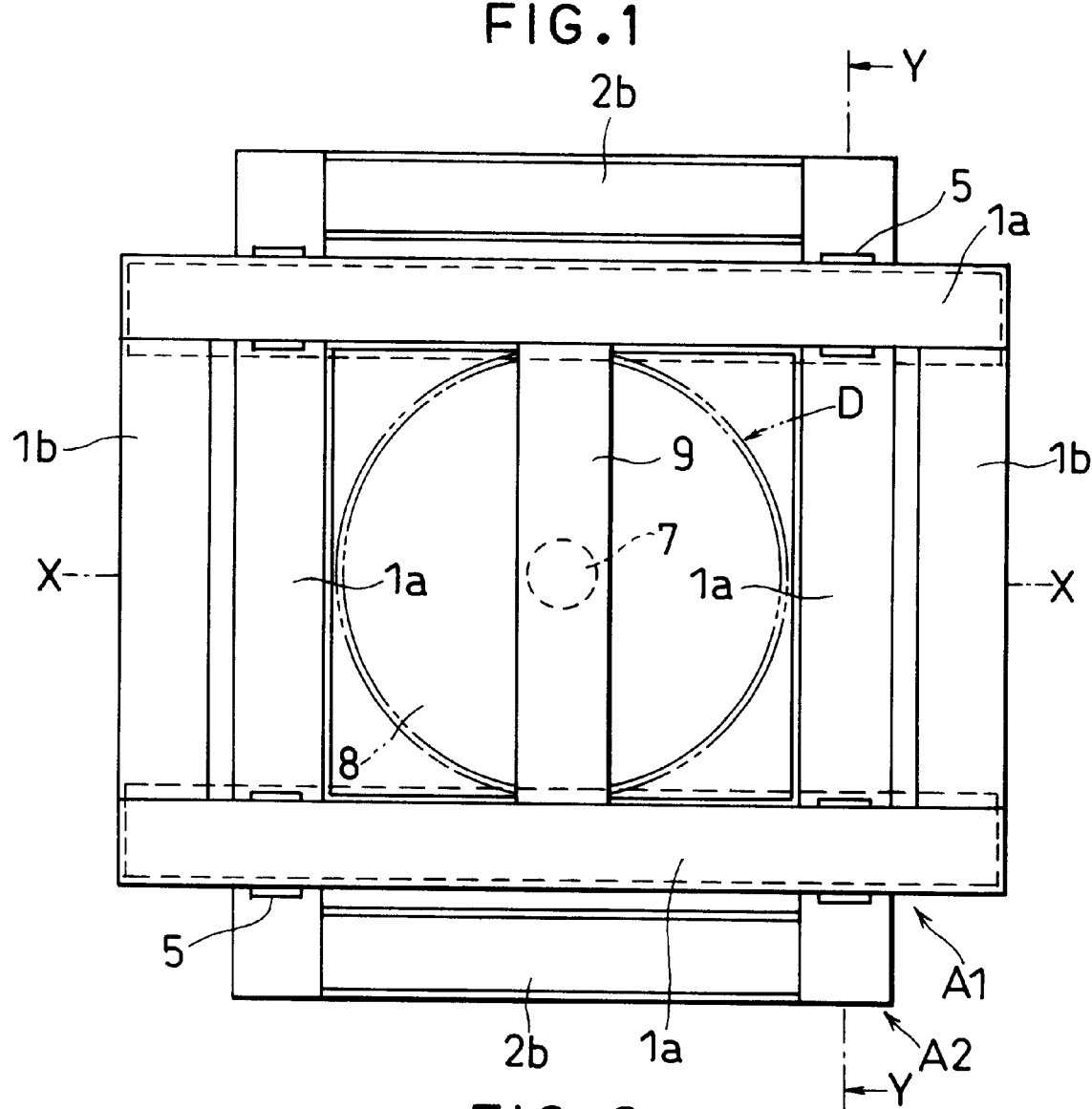
FIG. 1 is a plan view of an overall seismic isolation apparatus.
Figure 2:
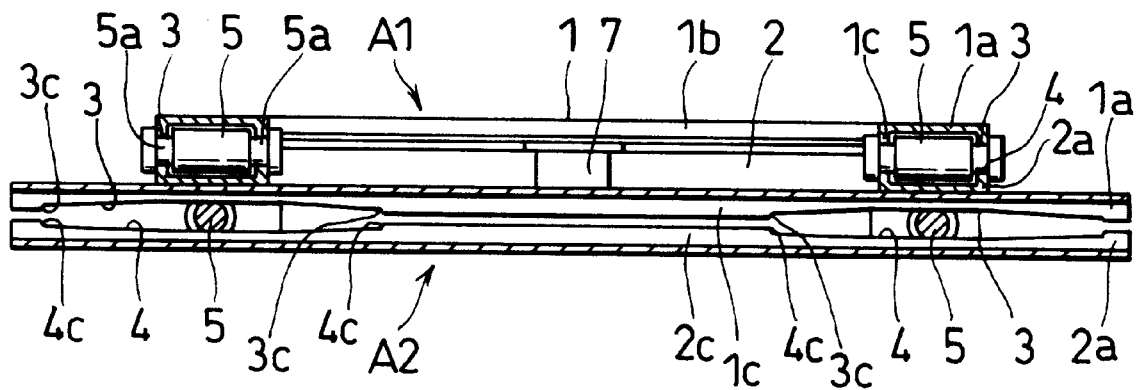
FIG. 2 is a vertical side sectional view taken along line Y—Y in FIG. 1.
Figure 3:
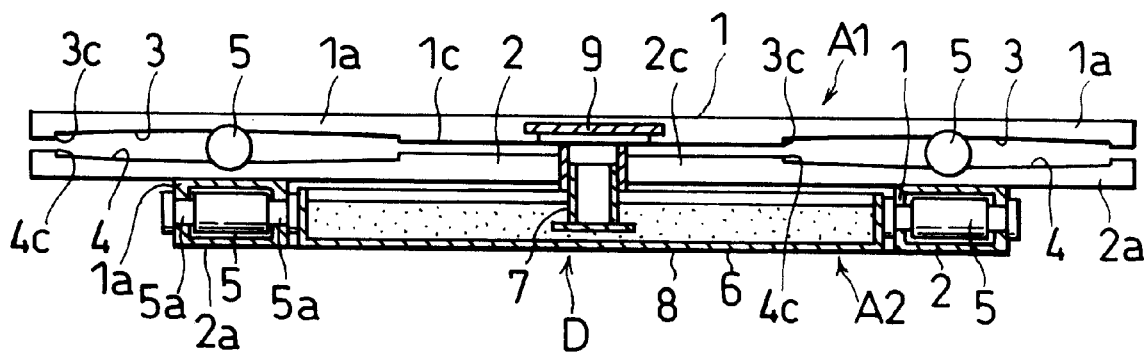
FIG. 3 is a vertical front sectional view taken along line X—X in FIG. 1.

Referring to the accompanying drawings, a description will be given of a preferred embodiment of the present invention. In FIGS. 1 to 3, an upper seismic isolation mechanism A1 is arranged such that a roller 5 with a circular cross section is interposed between upper and lower guide surfaces 3 and 4 in such a manner as to be capable of rolling in the same direction, the upper and lower guide surfaces 3 and 4 being provided at four sides on the opposing surfaces of upper and lower clamping members 1 and 2 combined in the shape of a rectangular frame. A lower seismic isolation mechanism A2 is arranged such that, in the same way as the upper seismic isolation mechanism A1, the roller 5 with a circular cross section is interposed between the upper and lower guide surfaces 3 and 4 which are provided at four sides on the opposing surfaces of the upper and lower clamping members 1 and 2 combined in the shape of a rectangular frame, the roller 5 being capable of rolling in a direction perpendicular to the rolling direction of the rollers of the upper seismic isolation mechanism A1. Since the specific structures of these upper and lower seismic isolation mechanisms A1 and A2 are identical except that they are superposed in such a manner as to be perpendicular to each other, a description will be given hereafter of the structure of the upper seismic isolation mechanism A1, and a detailed description of the lower seismic isolation mechanism A2 will be omitted.

In the upper and lower clamping members 1 and 2 of the upper seismic isolation mechanism A1, the upper clamping member 1 is arranged such that a pair of horizontal girder members 1a of an elongated rectangular shape made of channel steel having a fixed length and a fixed width are juxtaposed with a fixed interval provided therebetween in the transverse direction, and longitudinal opposite end portions of these horizontal girder members 1a are integrally secured to each other by a pair of connecting frame members 1b having a fixed length and a fixed width to form the shape of a rectangular frame. A pair of side wall portions 1c having a fixed height and constituted by flange portions of the channel steel are provided at opposite long side edges of each of the front and rear horizontal girder members 1a in such a manner as to project orthogonally downward. Further, as shown in FIG. 3, a pair of downward concave roller guide surfaces 3 are formed at longitudinal opposite side portions of each of the two side wall portions 1c with a fixed longitudinal interval provided therebetween.

The lower clamping member 2 is formed in a shape in which the upper clamping member 1 which does not use the pair of connecting frames 1b is inverted. Namely, the lower clamping member 2 is arranged such that a pair of horizontal girder members 2a of an elongated rectangular shape made of channel steel having the same length and width as the horizontal girder members 1a of the above-described upper clamping member 1 are juxtaposed with the same interval as that between the horizontal girder members 1a of the upper clamping member 1 in the transverse direction, and a pair of side wall portions 2c having a fixed height and constituted by flange portions of the channel steel are provided at opposite long side edges of each of the front and rear horizontal girder members 2a in such a manner as to project orthogonally upward. Further, as shown in FIG. 3, a pair of upward concave roller guide surfaces 4 are formed at longitudinal opposite side portions of each of the two side wall portions 2c with the same interval as that between the front and rear roller guide surfaces 3 of the upper clamping member 1. It goes without saying that, in the same way as the upper clamping member 1, this lower clamping member 2 may be arranged such that longitudinal opposite end portions of the front and rear horizontal girder members 2a are integrally secured to each other by a pair of connecting frame members to form the shape of a rectangular frame of the same size and shape as in the case of the upper clamping member 1. It should be noted that the side wall portions 1c and 2c of the horizontal girder members 1a and 2a of the upper and lower clamping members 1 and 2 may be provided only in lengthwise portions where the roller guide surfaces 3 and 4 are formed, apart from being provided over the entire length of the long side edges as in the above-described channel steel.

Figure 4:
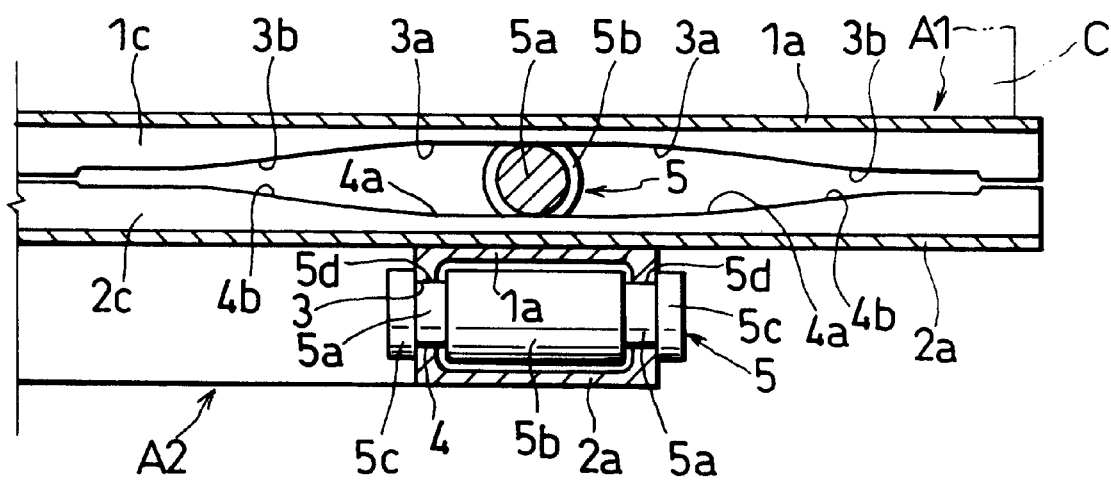
FIG. 4 is an enlarged vertical front sectional view of essential portions.

The vertically opposing pairs of roller guide surfaces 3 and 4 are provided on the four sides by superposing the upper and lower clamping members 1 and 2, such that all the pairs of upper and lower roller guide surfaces 3 and 4 are arranged in the same direction (in the left-and-right direction in the drawing). As shown in FIG. 4, as for the roller 5 interposed between the upper and lower guide surfaces 3 and 4, a pair of small-diameter opposite end portions 5a having a circular cross section and the same diameter are formed coaxially at axial opposite end portions of the roller 5 by cutting a pair of peripheral grooves 5d by leaving therebetween the same interval as the interval between the opposite side wall portions of the horizontal girder member. The opposite side wall portions 1c and 2c at the roller guide surface portions provided in the horizontal girder members 1a and 2a of the upper and lower clamping members 1 and 2 are fitted in these peripheral grooves 5d from above and from below, respectively, to allow the upper and lower roller guide surfaces 3 and 4 to come into clamping contact with upper and lower peripheral end surfaces of the pair of small-diameter opposite end portions 5a, respectively, thereby making it possible for the roller 5 to roll in contact with these upper and lower roller guide surfaces 3 and 4.

As for the roller 5, due to the formation of the pair of small-diameter opposite end portions 5a, a central roller portion 5b between the two small-diameter opposite end portions 5a as well as a pair of opposite end portions 5c are formed with a large diameter. However, most of the central roller portion 5b may be formed with a small diameter such that a pair of large-diameter flange portions are formed on both sides of each small-diameter opposite end portion 5a. In brief, the depth of the peripheral grooves 5d is set in such a manner that the large-diameter portion does not come into contact with the opposing surfaces of the upper and lower horizontal girder members 1a and 2a in the upper and lower clamping members 1 and 2.

The shape of the upper and lower roller guide surfaces 3 and 4 shown in FIG. 4 is formed in the shape of a Japanese bow. Namely, as for the upper roller guide surface 3, its longitudinal central portion is formed as a concavely arcuate curved surface 3a which is upwardly curved in a circular arc shape, portions extending from opposite ends of the concavely arcuate curved surface 3a are each formed as a convexly arcuate curved surface 3b which is downwardly curved in a circular arc shape, and the concavely arcuate curved surface 3a and the convexly arcuate curved surfaces 3b are smoothly connected with their radii of curvature gradually changed. The lower roller guide surface 4 is formed in a symmetrical shape in which the upper roller guide surface 3 is inverted. Namely, its longitudinal central portion is formed as a concavely arcuate curved surface 4a which is downwardly curved in a circular arc shape, and portions extending from opposite ends of the concavely arcuate curved surface 4a are each formed as a convexly arcuate curved surface 4b which is upwardly curved in a circular arc shape.

The upper seismic isolation mechanism A1 is arranged as described above, and since the lower seismic isolation mechanism A2 has the same structure as the upper seismic isolation mechanism A1, identical portions will be denoted by the same reference numerals, and a description thereof will be omitted. In FIG. 1, in a state in which the horizontal girder members 1a and 2a of the upper and lower clamping members 1 and 2 of the lower seismic isolation mechanism A2 are arranged at left and right, the lower clamping member 2 is fixed on an installation surface, and the upper seismic isolation mechanism A1 is superposed on the lower seismic isolation mechanism A2 in a state in which the horizontal girder members 1a and 2a of its upper and lower clamping members 1 and 2 are arranged on both sides, i.e., in a state of being perpendicular to the lower seismic isolation mechanism A2, thereby forming the seismic isolation apparatus. A loaded object, such as a building structure, an exhibit case, various machines and equipment, a floor, or the like, is placed on the upper clamping member 1 of the upper seismic isolation mechanism A1 of this seismic isolation apparatus so as to control the transmission of vibrations to the loaded object C during the occurrence of an earthquake.

In the upper and lower clamping members 1 and 2 which constitute the lower seismic isolation mechanism A2, the opposite ends of the pair of horizontal girder members 1a juxtaposed at left and right in the upper clamping member 1 with a fixed interval therebetween may be connected together by means of connecting frame members, but the connecting frame members are not used in the illustrated case. Meanwhile, the opposite ends of the pair of horizontal girder members 2a juxtaposed at left and right in the lower clamping member 2 with the same interval as that between the aforementioned horizontal girder members 1a are connected together by means of a pair of connecting frame members 2b. Then, in a state in which the pair of horizontal girder members 2a of the lower clamping member 2 of the upper seismic isolation mechanism A1 and the pair of horizontal girder members 1a of the upper clamping member 1 of the lower seismic isolation mechanism A2 are set perpendicular to each other and are thus combined in the shape of projecting parallels with their backs contacting each other, these horizontal girder members 2a and 1a are integrally connected together in advance by welding or the like. Then, after the upper clamping member 1 of the lower seismic isolation mechanism A2 is superposed on the lower clamping member 2 formed in the shape of the rectangular frame in the lower seismic isolation mechanism A2 with the rollers 5 interposed between the vertically opposing roller guide surfaces 3 and 4, the upper clamping member 1 formed in the shape of the rectangular frame is superposed on the lower clamping member 2 of the upper seismic isolation mechanism A1 with the rollers 5 interposed between the vertically opposing roller guide surfaces 3 and 4, thereby arranging the seismic isolation apparatus.

To describe the seismic isolation effect of this seismic isolation apparatus, the left and right swaying and the back and forth swaying in a case where an earthquake has occurred are respectively isolated by the upper seismic isolation mechanism A1 and the lower seismic isolation mechanism A2. However, since the swaying in the left-and-right direction and the swaying in the back-and-forth direction are isolated by the same operation, a description will be given hereafter of the operation of the upper seismic isolation mechanism A1.

When an earthquake occurs, the rectangular frame-shaped lower clamping member 2 of the seismic isolation mechanism A1 sways to left and right, the lower roller guide surfaces 4 provided at the four sides in the lower clamping member 2 move in the same direction, so that each roller 5, which was stationary on the central portion at the lowest position of the concavely arcuate curved surface 4a of the roller guide surface 4, rolls on the upwardly inclined curved surface of this concavely arcuate curved surface 4a, and due to this rolling the upper clamping member 1 undergoes relative movement in an opposite direction to the direction of the lower clamping member 2 by the rolling distance of the rollers 5. Namely, in FIG. 4, if the roller 5 rolls from the center of the concavely curved surface 4a in the roller guide surface 4 of the lower clamping member 2 to the convexly arcuate curved surface 4b on the right, the upper clamping member 1 moves from the center of the concavely arcuate curved surface 3a in the roller guide surface 3, which is the stationary position of the roller 5, to the convexly arcuate curved surface 3b on the left, so that the loaded object C is lifted by a height corresponding to the sum of projecting heights of the concavely arcuate curved surfaces 3b and 4b from the respective centers of the concavely arcuate curved surfaces 3a and 4a of the upper and lower roller guide surfaces 3 and 4.

It should be noted that the length of each of the roller guide surfaces 3 and 4 in the rolling direction of the roller may be set by taking into consideration an estimated maximum horizontal amplitude (e.g., 30 cm) at the time of an earthquake. In addition, as shown in FIGS. 2 and 3, at longitudinal opposite end portions of the roller guide surfaces 3 and 4, stoppers 3c and 4c for preventing the disengagement of the roller 5 are formed by end faces formed by bending in mutually opposing directions the longitudinal opposite end portions of the roller guide surfaces 3 and 4. As the shape of each of the roller guide surfaces 3 and 4 formed by the concavely arcuate curved surfaces 3a and 4a and the convexly arcuate curved surfaces 3b and 4b, it is possible to apply a track of a mass point of a building which moves due to an earthquake when the seismic isolation apparatus, in which eccentric rollers constituted by two rollers whose axes are eccentric to each other are interposed between the upper and lower clamping members, is provided between a foundation and the building, as disclosed by the present assignee in Japanese Patent Application Publication No. 32300/1987. In the case of the aforementioned eccentric rollers, restrictions are imposed by the rolling distance of the roller, the roller diameter, and the angle of rotation (0 to 180°). In the case of the present invention, however, restoring forces are provided by forming the roller guide surfaces 3 and 4 as curved surfaces, so that there is an advantage in that the rolling distance of the roller can be set to an arbitrary length.

Figure 5:
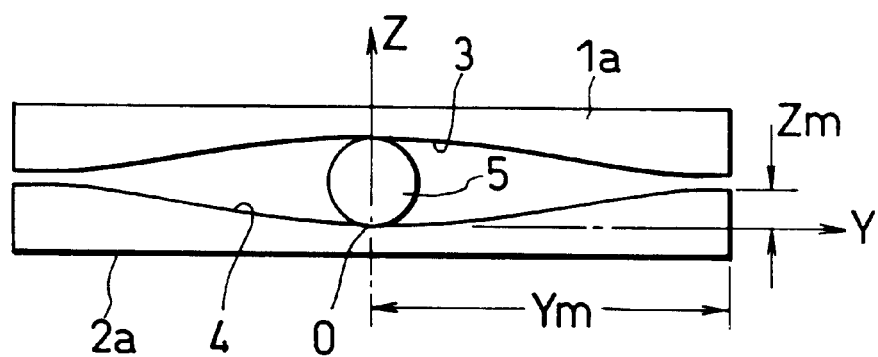
FIG. 5 is an explanatory diagram for determining a curve of a roller guide surface.

If it is assumed that, as shown in FIG. 5, the lowest point in the concavely arcuate curved surface, i.e., the point O which the roller 5 contacts in the stationary state of the seismic isolation mechanism, is an origin, a Y axis is taken in the horizontal direction from this point O, a Z axis is taken in the vertical direction from this point O, the horizontal length of each of the roller guide surfaces 3 and 4 is Ym, and the vertical height thereof is Zm, then the aforementioned shape of the curved surface of each of the roller guide surfaces 3 and 4 can be expressed by a cosine curve of the following formula in the YZ coordinates:

$$Z=0.5 \times Zm \times \{1-\cos(\pi Y/Ym)\}$$

The aforementioned curve has a characteristic wherein the gradient with respect to the Y axis is 0 at the origin O, the gradient increases gradually in a direction away from the origin O, at the point of connection from the concavely arcuate curved surface to the convexly arcuate curved surface the gradient becomes maximum and then gradually decreases, and the gradient becomes 0 at a terminal point P (Ym, Zm) of the convexly arcuate curved surface.

Figure 12:
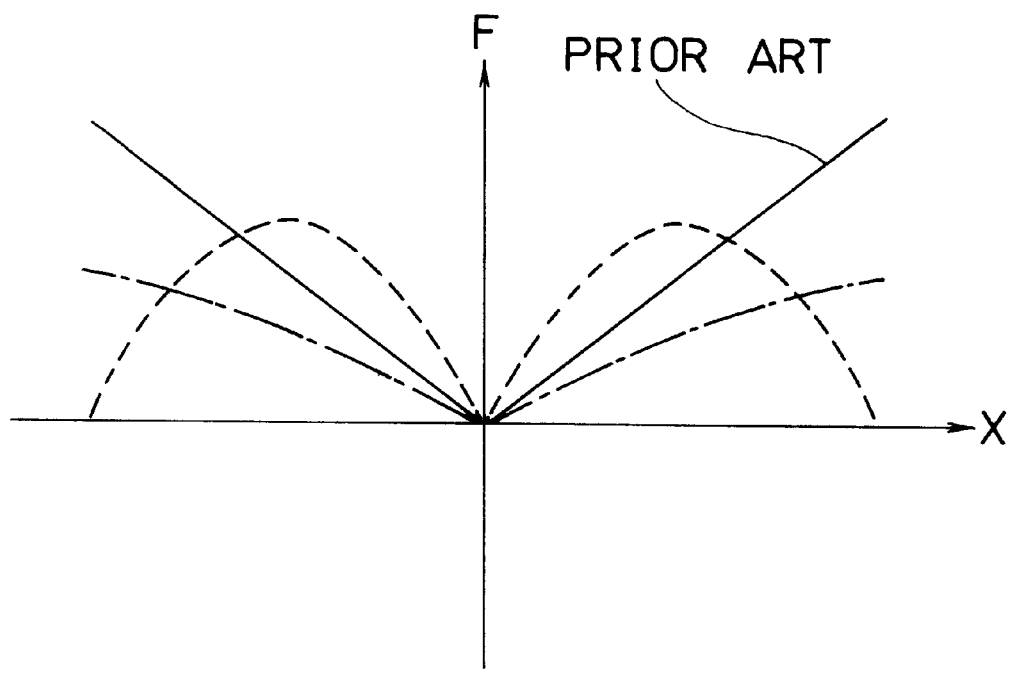
FIG. 12 is a characteristic diagram.

As described above, since the upper and lower roller guide surfaces 3 and 4 are arranged such that their central portions are formed as the concavely arcuate curved surfaces 3a and 4a and portions extending from opposite ends of the concavely arcuate curved surfaces 3a and 4a are respectively formed as the convexly arcuate curved surfaces 3b and 4b as described above, when the roller 5 rolls from the center in the concavely arcuate curved surface 4a to the convexly arcuate curved surface 4b on the right side in the roller guide surface of the lower clamping member 2, if the roller 5 rolls by the distance X from its stationary position, a restoring force F for restoring the loaded object C in the meantime assumes a nonlinear curve as indicated by a dotted line in FIG. 12. Accordingly, the spring constant (restoring characteristic) of the supporting portion of the roller 5 changes as the roller 5 rolls, and the natural frequency of the seismic isolation mechanism A1 changes in correspondence with that change. Hence, the seismic isolation mechanism A1 practically does not resonate, thereby exhibiting a seismic isolation effect. It should be noted that the shape of each of the aforementioned roller guide rollers 3 and 4 is not limited to the aforementioned track.

Figure 6:
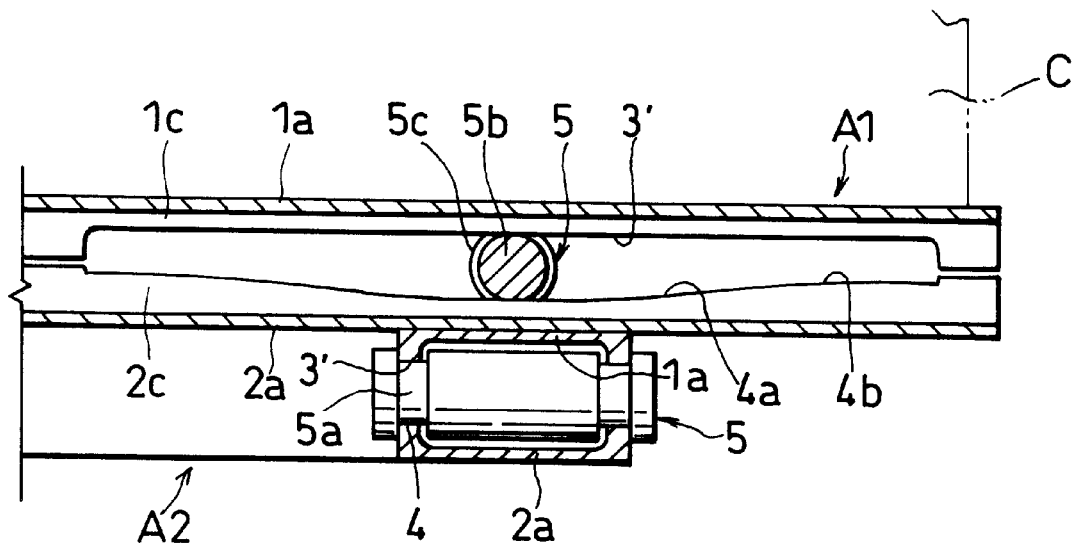
FIG. 6 is an enlarged vertical front sectional view of the essential portions in which the roller guide surface is formed in a different shape.

FIG. 6 shows an example in which, in all the upper and lower roller guide surfaces 3 and 4 in the upper and lower seismic isolation mechanisms A1 and A2, one roller guide surface 3 is formed as a horizontally flat surface 3', while, in the same way as described above, the other roller guide surface 4 is arranged such that its central portion is formed as the concavely arcuate curved surface 4a, and the portions extending from opposite ends of the concavely arcuate curved surface 4a are formed as the convexly arcuate curved surfaces 4b. Even in a case where such an arrangement is provided, if the roller 5 rolls by the distance X from its stationary position, the restoring force F for restoring the loaded object C in the meantime assumes a gentle curve which is nonlinear as shown by the dotted line in FIG. 12. Accordingly, it is possible to arrange a seismic isolation structure in which a fixed natural frequency does not occur, and which does not resonate with the seismic waves.

To ensure that the possibility of resonance with the seismic waves practically does not occur, apart from providing the above-described upper and lower roller guide surfaces 3 and 4, in which the radius of curvature changes continuously in the longitudinal direction, or the upper roller guide surface 3' having the horizontally flat surface, the roller guide surfaces may be formed by curved surfaces having fixed radii of curvature. Still alternatively, it suffices if one roller guide surface is formed as a concavely arcuate roller guide surface having a fixed radius of curvature, while the other roller guide surface is formed as a horizontally flat roller guide surface or a concavely arcuate roller guide surface having a radius of curvature different from that of one roller guide surface. Even in the case where such an arrangement is provided, if the roller 5 rolls by the distance X from its stationary position, the restoring force F for restoring the loaded object C in the meantime becomes nonlinear as shown by the dotted-dash line in FIG. 12.

As for the roller 5 which is in contact with the upper and lower roller guide surfaces 3 and 4, the pair of small-diameter opposite end portions 5a having a circular cross section and the same diameter are formed coaxially at the axial opposite end portions by cutting the pair of peripheral grooves 5d as described above, and the opposite side wall portions 1c and 2c at the roller guide surface portions provided in the horizontal girder members 1a and 2a of the upper and lower clamping members 1 and 2 are fitted in these peripheral grooves 5d from above and from below, respectively, to allow the upper and lower roller guide surfaces 3 and 4 to come into clamping contact with the upper and lower peripheral end surfaces of the pair of small-diameter opposite end portions 5a, respectively. Hence, the roller 5 is clamped by the opposite side wall portions 1c and 2c of the upper and lower horizontal girder members 1a and 2a in a state in which it is supported at its opposite ends, so that the roller 5 is prevented from becoming unsteady or displaced. Further, the roller 5 is not subjected to bending stress, and rolls smoothly in an accurate direction along the opposite side wall portions 1c and 2c of the upper and lower horizontal girders 1a and 2a. Moreover, since the upper and lower clamping members 1 and 2 are combined in advance in the shape of a rectangular frame, and the roller guide surfaces are formed by being arranged in the same direction at the opposite end sides of the juxtaposed horizontal girder members, i.e., at the four sides in a plan view, all the roller guide surfaces move simultaneously in the same direction. Hence, it is possible to arrange a seismic isolation apparatus exhibiting high accuracy.

Figure 7:
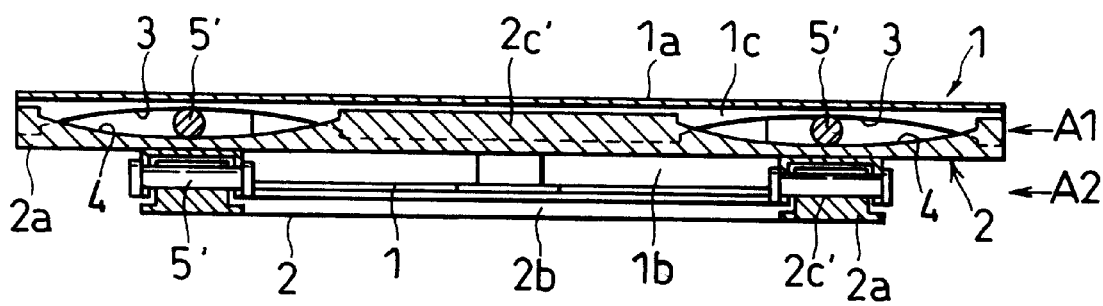
FIG. 7 is a vertical front sectional view of the seismic isolation apparatus in which upper and lower clamping members partially overlap.
Figure 8:
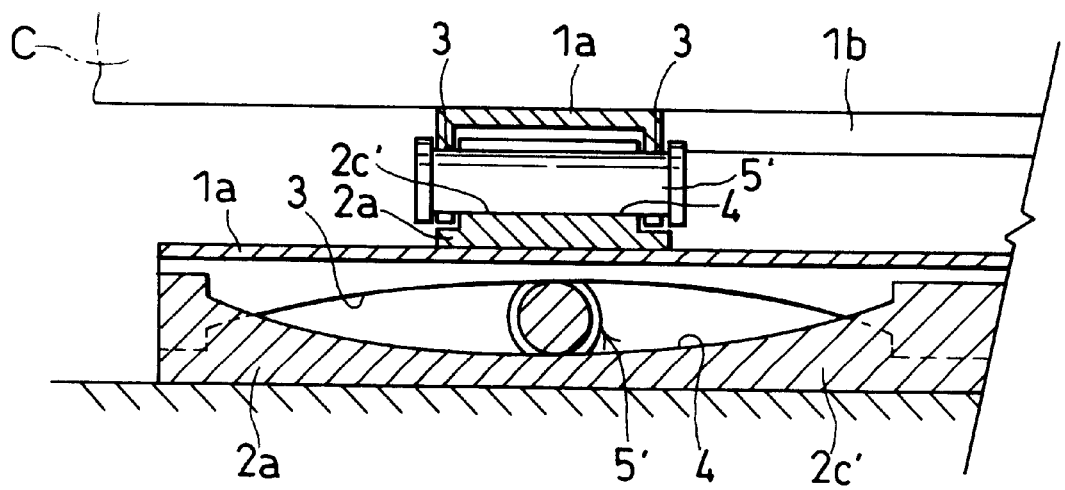
FIG. 8 is an enlarged vertical side sectional view of essential portions of the seismic isolation apparatus.
Figure 9:
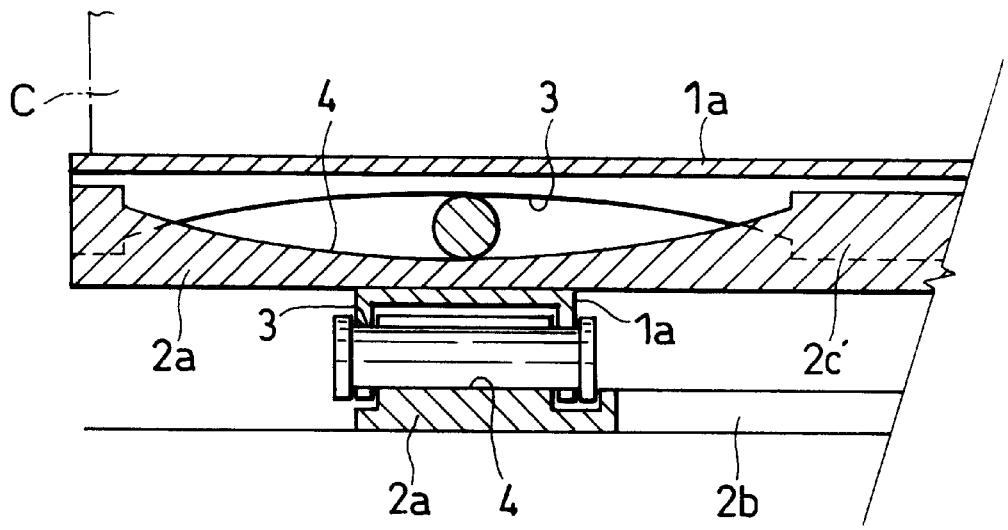
FIG. 9 is an enlarged vertical front sectional view of essential portions of the seismic isolation apparatus.

FIGS. 7 to 9 show a seismic isolation apparatus in which, in the upper and lower clamping members 1 and 2 constituting the seismic isolation mechanism, as the shape of each of the pair of horizontal girder members 1a of one clamping member 1, the pair of side wall portions 1c having a fixed height are provided at opposite long side edges thereof, and the pair of roller guide surfaces 3 are formed on the side wall portions 1c with a fixed interval therebetween in the longitudinal direction, in the same way as described above. On the other hand, the other clamping member 2 is not provided with the pair of opposite horizontal girder members 2a formed of the channel steel described above. Instead, a rail portion 2c' which is interposed between the pair of opposite side wall portions 1c provided projectingly from the horizontal girder member 1a of one clamping member 1 is provided integrally on a central portion of a horizontal steel plate whose plan shape is the same as that of the horizontal girder member 1a of one clamping member 1. The pair of roller guide surfaces 4 respectively opposing the pair of roller guide surfaces 3 formed on one horizontal girder member 1a are formed on this rail portion 2c', and rollers 5' are each interposed between the upper and lower roller guide surfaces 3 and 4 arranged as described above.

Figure 10:
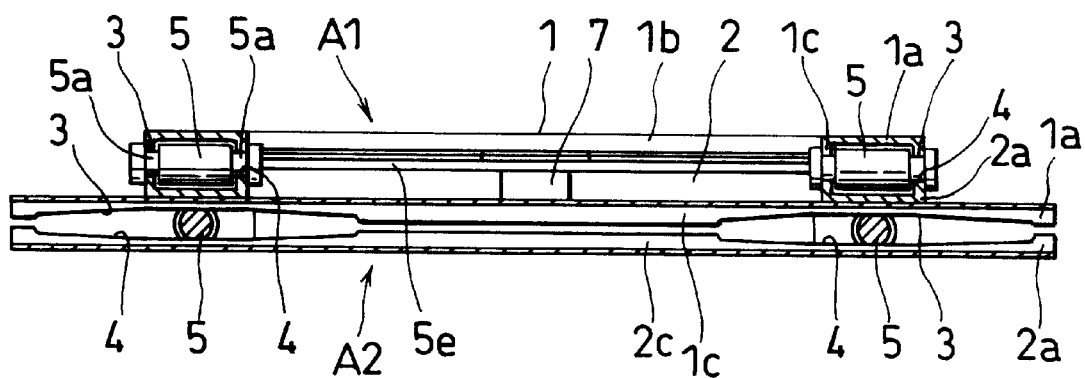
FIG. 10 is a vertical side sectional view of a seismic isolation apparatus in which rollers opposing each other in the extended direction of their axes are connected together.
Figure 11:
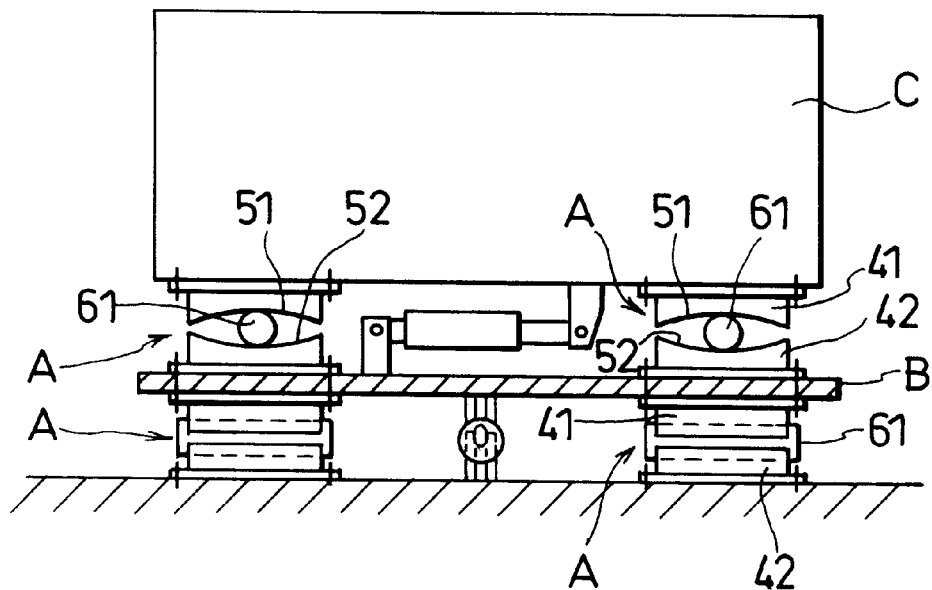
FIG. 11 is a schematic front elevational view of a conventional example.

If this arrangement is provided, the longitudinal opposite end portions of the upper and lower guides surfaces 3 and 4 are set in a state in which they partially overlap in a side view, so that the thickness (height) of the seismic isolation mechanisms A1 and A2 formed by the upper and lower clamping members 1 and 2 can be made even lower, and the loaded object C can be supported more stably. It should be noted that an arrangement can be provided such that the aforementioned rail portion 2c' is formed as two parallel rail portions, the roller is formed as a pair of left and right rollers formed integrally by a connecting center shaft and each having a pair of large-diameter flange portions at its opposite ends, and a pair of small-diameter end portions formed by its peripheral grooves are interposed between the upper and lower roller guide surfaces 3 and 4 on both sides. The seismic isolation apparatus shown in FIG. 10 is arranged such that the pair of rollers 5 opposing each other in the extended direction of their axes are connected together by a shaft 5e. If such an arrangement is provided, the tendency of the rollers 5 to be lifted up during an earthquake can be suppressed with respect to each other by means of the shaft 5e.

In any one of the above-described seismic isolation apparatuses, a vibration damping means D is disposed for allowing the roller to stop at its stationary position speedily so as to return the upper and lower clamping members 1 and 2 back to the normal state after the earthquake has subsided. As shown in FIG. 3, this vibration damping means D is comprised of viscous oil 6 and a resistance member 7. The viscous oil 6 is accommodated in a circular dish-shaped oil container 8 which is disposed within the frame of the upper and lower clamping members 1 and 2 in the lower seismic isolation mechanism A2 and whose outer peripheral wall portion is integrally secured to inner peripheral surfaces of the frame of the lower clamping member 2. Meanwhile, the resistance member 7 is integrally secured to the center of a lower surface of a supporting beam member 9 connected to central portions of the pair of horizontal girder members 1a in the upper clamping member 1 of the upper seismic isolation mechanism A1, and its lower half portion is immersed in the aforementioned viscous oil 6 filled in the oil container 8 through a central portion within the frame of the upper and lower clamping members 1 and 2 of the seismic isolation mechanism A1.

Thus, since the oil container 8 is secured within the frame of the lower clamping member 2 of the lower seismic isolation mechanism A2, and the resistance member 7 is suspended from the central portion within the frame of the upper clamping member 1 of the upper seismic isolation mechanism A1, not only can the space within the rectangular frame-shaped clamping members 1 and 2 be effectively utilized for the disposition of the vibration damping means D, but also the resistance member 7 during the occurrence of an earthquake moves horizontally back and forth and left and right inside the oil container 8, thereby making it possible to reliably absorb and attenuate the seismic energy.

What is claimed is:

1. A seismic isolation apparatus comprising upper and lower seismic isolation mechanisms each having a pair of upper and lower clamping members with, in a number of locations on opposing surfaces thereof, upper and lower roller guide surfaces, and rollers each having a circular cross-section and respectively interposed between the upper and lower roller guide surfaces in such a manner as to be capable of rolling in an identical horizontal direction, said upper and lower seismic isolation mechanisms being combined vertically integrally such that a rolling direction of the rollers in said upper seismic isolation mechanism intersects a rolling direction of the rollers in said lower seismic isolation mechanism, at least one of the upper and lower roller guide surfaces including a concavely arcuate curved surface in a central portion thereof in the rolling direction of the roller, and convexly arcuate curved surfaces in portions thereof respectively extending from opposite ends of the concavely arcuate cured surface.

2. The seismic isolation apparatus according to claim 1, wherein another of the upper and lower roller guide surfaces includes a flat surface or a concavely arcuate surface having a large radius of curvature.

3. The seismic isolation apparatus according to claim 2 wherein if it is assumed that a lowest point in the concavely arcuate curved surface is an origin, and axes are taken in horizontal and vertical directions from said lowest point, then each of the upper and lower roller guide surfaces has a curve expressed by the following formula:

$$z = 0.5 \times Zm \times \{1 - \cos(\pi Y/YNm)\}$$

wherein Ym represents a horizontal length of each of the upper and lower roller guide surfaces and Zm represents a vertical height of each of the upper and lower roller guide surfaces.

4. The seismic isolation apparatus according to claim 1 wherein another one of the upper and lower roller guide surfaces includes a curved surface identical in shape to said one of the upper and lower roller guide surfaces.

5. The seismic isolation apparatus according to claim 4 wherein if it is assumed that a lowest point in the concavely arcuate curved surface is an origin, and axes are taken in horizontal and vertical directions from said lowest point, then each of the upper and lower roller guide surfaces has a curve expressed by the following formula:

$$z = 0.5 \times Zm \times \{1 - \cos(\pi Y/Ym)\}$$

wherein Ym represents a horizontal length of each of the upper and lower roller guide surfaces and Zm represents a vertical height of each of the upper and lower roller guide surfaces.

6. The seismic isolation apparatus according to claim 1 wherein if it is assumed that a lowest point in the concavely arcuate curved surface is an origin, and axes are taken in horizontal and vertical directions from said lowest point, then each of the upper and lower roller guide surfaces has a curve expressed by the following formula:

$$z = 0.5 \times Zm \times \{1 - \cos(\pi Y/Ym)\}$$

wherein Ym represents a horizontal length of each of the upper and lower roller guide surfaces and Zm represents a vertical height of each of the upper and lower roller guide surfaces.

7. The seismic isolation apparatus according to claim 1 wherein said upper clamping member has an upper horizontal girder member provided on opposite long side edges thereof with a pair of opposing side wall portions having a fixed height and projecting downward, said lower clamping member has a lower horizontal girder member juxtaposed with said upper horizontal girder member and provided with a pair of opposing side wall portions having a fixed height and projecting upward, the upper and lower roller guide surfaces being respectively formed on the opposing side wall portions of said upper and lower horizontal girder members, and each of said rollers being interposed between said upper and lower horizontal girder members such that small-diameter opposite end portions of each of said rollers are brought into clamping contact with the upper and lower roller guide surfaces in such a manner as to be capable of rolling.

8. The seismic isolation apparatus according to claim 1 wherein each of said upper and lower clamping members has horizontal girder members juxtaposed with each other, said horizontal girder member of one of said clamping members being provided on opposite long side edges thereof with a pair of side wall portions having a fixed height, said horizontal girder member of another one of said clamping members being formed in a central portion thereof with a rail portion which is interposed between the side wall portions of one of said clamping members, the upper and lower roller guide surfaces are respectively formed on the side wall portions and the rail portion of said upper and lower clamping members, and each of said rollers being interposed between said upper and lower roller guide surfaces in such a manner as to be capable of rolling.

9. The seismic isolation apparatus according to claim 1 wherein the upper and lower seismic isolation mechanisms are combined vertically integrally such that a rolling direction of the rollers in said upper seismic isolation mechanism are perpendicular to the rolling direction of the rollers in said lower seismic isolation mechanism.

10. A seismic isolation apparatus comprising upper and lower seismic isolation mechanisms each having a pair of upper and lower clamping members with, in a number of locations on opposing surfaces thereof, upper and lower roller guide surfaces, and rollers each having a circular cross-section and respectively interposed between the upper and lower roller guide surfaces in such a manner as to be capable of rolling in an identical horizontal direction, said upper and lower seismic isolation mechanisms being combined vertically integrally such that a rolling direction of the rollers in said upper seismic isolation mechanism intersects a rolling direction of the rollers in said lower seismic isolation mechanism, one of the upper and lower roller guide surfaces including a concavely arcuate roller guide surface having a fixed radius of curvature, while another one of the upper and lower roller guide surfaces includes a flat roller guide surface or a concavely arcuate roller guide surface having a radius of curvature different from that of one of the upper and lower roller guide surfaces.

11. The seismic isolation apparatus according to claim 10 wherein said upper clamping member has an upper horizontal girder member provided on opposite long side edges thereof with a pair of opposing side wall portions having a fixed height and projecting downward, said lower clamping member has a lower horizontal girder member juxtaposed with said upper horizontal girder member and provided with a pair of opposing side wall portions having a fixed height and projecting upward, the upper and lower roller guide surfaces being respectively formed on the opposing side wall portions of said upper and lower horizontal girder members, and each of said rollers being interposed between said upper and lower horizontal girder members such that small-diameter opposite end portions of each of said rollers are brought into clamping contact with the upper and lower roller guide surfaces in such a manner as to be capable of rolling.

12. The seismic isolation apparatus according to claim 10 wherein each of said upper and lower clamping members has horizontal girder members juxtaposed with each other, said horizontal girder member of one of said clamping members being provided on opposite long side edges thereof with a pair of side wall portions having a fixed height, said horizontal girder member of another one of said clamping members being formed in a central portion thereof with a rail portion which is interposed between the side wall portions of one of said clamping members, the upper and lower roller guide surfaces are respectively formed on the side wall portions and the rail portion of said upper and lower clamping members, and each of said rollers being interposed between said upper and lower roller guide surfaces in such a manner as to be capable of rolling.

13. The seismic isolation apparatus according to claim 10 wherein the upper and lower seismic isolation mechanisms are combined vertically integrally such that a rolling direction of the rollers in said upper seismic isolation mechanism are perpendicular to the rolling direction of the rollers in said lower seismic isolation mechanism.

* * * * *

UNITED STATES PATENT AND TRADEMARK OFFICE

CERTIFICATE OF CORRECTION

PATENT NO.   : 6,123,313
DATED        : September 26, 2000
INVENTOR(S)  : OTSUKA et al It is certified that error appears in the above-identified patent and that said letters patent is hereby corrected as shown below:

Column 13 (Claim 3, line 7), change "YNm" to --Ym--.

Signed and Sealed this

Fifteenth Day of May, 2001

*Attest:*

NICHOLAS P. GODICI

*Attesting Officer*   Acting Director of the United States Patent and Trademark Office